United States Patent [19]

Sakai et al.

[11] Patent Number: 4,973,940
[45] Date of Patent: Nov. 27, 1990

[54] OPTIMUM IMPEDANCE SYSTEM FOR COUPLING TRANSCEIVER TO POWER LINE CARRIER NETWORK

[75] Inventors: Hiroshi Sakai, Kasugai, Japan; William H. McGinnis, San Antonio, Tex.; Hideo Nishibayashi, Kakamigahara, Japan

[73] Assignee: Colin Electronics Co., Ltd., Komaki, Japan

[21] Appl. No.: 71,641

[22] Filed: Jul. 8, 1987

[51] Int. Cl.$^5$ .................. H04B 1/48; H04M 11/06
[52] U.S. Cl. .................. 340/310 R; 333/101; 333/124; 333/132; 455/78; 455/5
[58] Field of Search .............. 333/101, 109, 124, 129, 333/131, 132; 340/310 R, 310 A; 455/78, 88, 5, 14; 375/7, 36

[56] References Cited

U.S. PATENT DOCUMENTS

| | | | |
|---|---|---|---|
| 3,366,738 | 1/1968 | Feder | 333/101 X |
| 3,659,280 | 4/1972 | Donohoo | 333/132 X |
| 3,696,383 | 10/1972 | Oishi et al. | 340/310 A X |
| 3,818,481 | 6/1974 | Dorfman et al. | 340/310 R |
| 3,938,129 | 2/1976 | Smither | 340/310 R |
| 4,038,601 | 7/1977 | Laborie et al. | 333/131 X |
| 4,210,901 | 7/1980 | Whyte et al. | 455/78 X |
| 4,300,126 | 11/1981 | Gajjor | 340/310 R X |
| 4,333,326 | 2/1984 | Howell | 340/310 R X |
| 4,633,217 | 12/1986 | Akano | 340/310 H |
| 4,654,630 | 3/1987 | Adame | 340/310 R |
| 4,686,382 | 8/1987 | Shirey | 340/310 R X |
| 4,697,166 | 9/1987 | Warmgiris et al. | 340/310 R |
| 4,766,414 | 8/1988 | Shirey | 340/310 R X |

FOREIGN PATENT DOCUMENTS

| | | | |
|---|---|---|---|
| 18334 | 10/1980 | European Pat. Off. | 340/310 R |
| 142642 | 8/1983 | Japan | 340/310 A |

Primary Examiner—Eugene R. LaRoche
Assistant Examiner—Benny T. Lee
Attorney, Agent, or Firm—Matthews & Branscomb

[57] ABSTRACT

A method and apparatus for efficiently coupling a transceiver to an AC power line transmission system. The preferred embodiment of the coupling system comprises a line coupling network and first and second filter ports. The first filter port is connected to a resonant circuit having bandpass filtering characteristics adapted to the specific needs of the transmitter portion of the transceiver. The second filter port is isolated from the low impedance of the AC power line and is connected to a high quality factor filter having bandpath filtering characteristics adapted to the specific needs of the receiver portion of the transceiver.

7 Claims, 1 Drawing Sheet

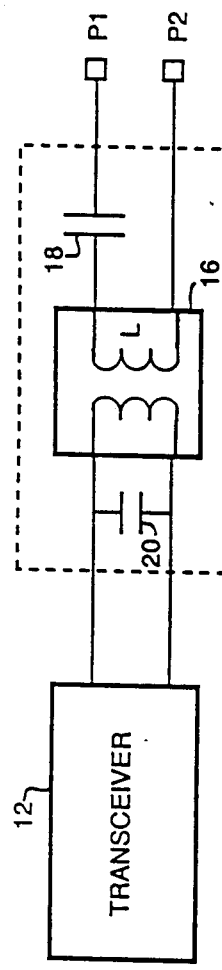

OPTIMUM IMPEDANCE SYSTEM FOR COUPLING TRANSCEIVER TO POWER LINE CARRIER NETWORK

FIELD OF THE INVENTION

The present invention relates generally to the field of communications and data transmission systems. More specifically, the present invention provides a system which ensures optimum impedance for coupling a transceiver to a power line carrier network in either the transmit or the receive mode of operation.

BACKGROUND

It is often desirable to be able to communicate between a number of stations in the same building without installing a dedicated data transmission network. One approach for achieving such a data link is to use the building's existing power line transmission network. Data transmission systems based on existing power line transmission networks are generally referred to as Power Line Carrier (PLC) systems or Power Line Data Transmission (PLDT) systems.

Most of the previous applications for PLDT systems have involved single station to single station communications. Examples of such systems include intercoms and appliance controllers. In some applications, such as appliance controllers, a number of receivers are connected to the power line, but are controlled by a single transmitter. Systems comprising multiple transmitters and multiple receivers have not been used in the past because of a number of difficulties involved in coupling the multiple transmitters and receivers (transceivers) to the power transmission line. In particular, previous systems attempting to employ multiple transceivers have had a very limited range and effectiveness because of line coupling difficulties.

A typical AC power transmission line normally has a very low impedance, on the order of one to ten ohms. The low impedance of the AC line at frequencies usable for communications causes significant difficulties with regard to the coupling and filtering of the transmitted and received signals. The transmitter and the receiver portion of a transceiver have different coupling and filtering requirements when used for communications over power lines. In general, the coupling circuit used for the transmitter should have a very low loss, while providing moderate rejection and a fairly wide bandwidth. The loss of the transmitter coupling circuit must be low because the power requirements needed to overcome loss rise very rapidly and thus quickly become unfeasible. Bandwidth and rejection are not particularly important for a transmitter, with the exception of harmonic rejection and rejection of intermodulation signals. The receiver portion of the transceiver can withstand a fairly high loss factor, on the order of 20 dB, but the rejection should be as high as possible. The filter loss can be high because the signal to noise ratio of the received signal is limited by the noise present on the power line.

Previous coupling circuits for connecting transceivers to power transmission lines typically employ tuned tank circuits comprising a capacitor connected to the winding of a transformer. This type of coupling circuit defines a bandpass filter having a relatively low loss and moderate rejection. While this circuit is suitable for use by the transmitter, it does not meet the coupling requirements of the receiver. Systems using a single circuit of this type for coupling the signals of both the transmitter and the receiver have, therefore, been ineffective for the reasons discussed above.

SUMMARY OF THE INVENTION

The present invention overcomes the difficulties of the prior art by providing an optimum impedance system for coupling a transceiver to a power line carrier network. Specifically, the present invention provides a coupling circuit having a low impedance when the transceiver is operating in the transmit mode and having a high impedance when the transceiver is operating in the receive mode. The coupling circuit of the present invention is broadly comprised of a series connection of at least one capacitor and a plurality of inductive elements. The capacitor and at least one of the inductive elements have predetermined values which are selected to optimize the circuit for the range of frequencies over which the transceiver operates. At least one of the inductive elements has an impedance value which can be changed to provide optimum impedance when operating in either the transmit or the receive mode.

In the preferred embodiment, the coupling circuit comprises at least one capacitor and one inductor having predetermined values. The capacitor and the inductor are in series connection with the primary windings of first and second transformers. The receiver and the transmitter portions of the transceiver receive or transmit their respective signals through a tuned circuit connected to the secondary winding of the first and second transformers. The variable impedance is provided by the primary winding of the first transformer to which the receiver is connected. When the transceiver is operating in the receive mode, the primary winding presents a high impedance at the tuned frequency of the receiver. However, when the transceiver is operating in the transmit mode, a switch disconnects a tuning capacitor on the secondary winding of the transformer, thus causing the primary winding to operate as a low impedance series inductor, thus causing the coupling circuit to have a low impedance in the transmit mode.

BRIEF DESCRIPTION OF THE DRAWINGS

FIG. 1 is a schematic representation of a conventional coupling circuit for connecting a PLDT transceiver to an AC power transmission line.

FIG. 2 is a schematic block diagram of the preferred embodiment of the transceiver coupling system of the present invention.

DETAILED DESCRIPTION OF THE PREFERRED EMBODIMENT

Referring to the figures in more detail, and to FIG. 1 in particular, a simplified schematic block diagram is shown of a power line data transmission (PLDT) system 10 which is coupled to terminals P1 and P2 of an AC power line by a prior art coupling circuit 14. The coupling and filtering characteristics of the coupling circuit 14 are determined by the transformer 16 and by capacitors 18 and 20. Referring to the portion of the coupling circuit 14 which is directly connected to the terminals of the power line, it can be seen that the effective impedance of the coupling circuit will be determined by the capacitor 18 and the inductance defined by the primary winding L of the transformer 16.

As was discussed above, the transmitter and receiver sections of a PLDT transceiver 12 have different filtering requirements. The filter of the transmitter section should have as low a loss as possible, while providing relatively moderate rejection and fairly wide bandwidth. Typical acceptable values for such a filter are 30 dB per octave of rejection and a bandwidth which is 20 percent of the transmitter frequency compared to the modulation frequency. In general, a coupling circuit such as that shown in FIG. 1 is well suited for use by the transmitter portion of the transceiver 12 but is not well suited to the needs of the receiver portion. However, such a coupling circuit can be used by both transmitters and receivers in a PLDT system with certain compromises. In particular, this conventional coupling circuit can be used in a PLDT system in which multiple transceivers are operating on a single carrier frequency using a frequency coded or token passing transmission protocol. The receiver portions of the various transceivers will be compromised, however, because of the failure of the coupling circuit to meet the preferred coupling characteristics discussed above.

The coupling circuit shown in FIG. 1, is unsuitable for PLDT systems in which multiple transceivers are operated on different carrier frequencies. For such systems, the coupling circuit 22 of the preferred embodiment, shown in FIG. 2, offers improved coupling characteristics which meet the specific needs of both the transmitter and the receiver of a PLDT transceiver. As can be seen in FIG. 2, the coupling circuit 22 of the present invention comprises separate transformers 28 and 30 for coupling the receiver and transmitter portions of the transceiver to the AC power line. Referring to the portion of the coupling circuit which is directly connected to the terminals of the power line, it can be seen that the effective impedance of the coupling circuit is determined by the combined impedances of the capacitor 24 (C1), the inductor 26 (L1) and the inductances defined by the primary windings of the transformers 28 and 30 (L2 and L3, respectively). The combined effective impedances of these elements is defined by the following relation:

$$X_T = X_{L1} + X_{L2} + X_{L3} - X_{C1} \qquad \text{Eq.(1)}$$

For an optimum impedance coupling circuit during the transmit mode, the combined impedance $X_T$ of equation (1) should be approximately equal to the impedance of the AC line, or approximately one to ten ohms. However, in the receive mode, the combined impedance $X_T$ of equation (1) should be relatively high, for example, between 350 and 400 ohms. In the coupling circuit of the present invention, these two optimum conditions are achieved by operation of the transmit/receive switch 36 which controls the circuit elements connected to the secondary winding of the transformer 28. When the transceiver is operating in the receive mode, the switch 36 connects the tuning capacitor 32 to the secondary winding of transformer 28. This causes the primary winding of transformer 28 to have a high impedance, thus contributing to the total impedance required for optimum receiver coupling as defined by equation (1). However, when the transceiver is operating in the transmit mode, the tuning capacitor 32 is disconnected from the secondary winding of the receiver transformer 28. This causes the primary winding of the transformer 28 to act as a low impedance series inductor, much like FIG. 1, rather than the high impedance which it presents at the tuned frequency during the receive mode. Thus the impedance of the coupling circuit as defined by equation (1) will be sufficiently low, where capacitor 34 functions like capacitor 20, FIG. 1, to meet the optimum impedance requirements of the transceiver 12 when operating in the transmit mode. The impedances contributed by the capacitor 24 and the inductor 26 will always be included in the total impedance as defined in equation (1) with the relative values being dependent on the specific operating frequency. The values of these circuit components can be selected to optimize the impedance of the coupling circuit for the range of frequencies over which the transceiver will be operating.

In addition to the advantages discussed above, the coupling circuit of the present invention overcomes signal degradation problems which are often encountered when operating multiple transceivers on a power line. The tuning circuit for coupling the receiver portion of a transceiver to a power line typically presents a high impedance at the tuned center frequency, but presents a low impedance at frequencies slightly removed from the center frequency. This low impedance tends to degrade the performance of receivers operating at other frequencies on the power line. This problem is overcome in the present invention by the high impedance isolation circuit 38 which is connected between the output of the transformer 28 and the input of the receiver portion of the transceiver 28. The high impedance isolation circuit 38 prevents signal degradation by presenting a sufficiently high impedance to reduce the loading of the line when multiple receivers are coupled thereto.

Another common problem encountered when using conventional coupling circuits to connect transceivers to a power line is reduced selectivity of the receiver portions of the transceivers. In the coupling circuit of the present invention, the selectivity of the receivers is enhanced by a tunable filter 40 which is connected between the high impedance isolation circuit 38 and the input to the receiver portion of the transceiver 12. Since the tunable filter 40 is isolated from the low impedance of the AC line by the isolation circuit, it can be adjusted to have the quality factor and narrow bandwidth characteristics needed by a receiver operating at a particular frequency.

The invention method and apparatus for coupling a transceiver to a power transmission line offers numerous advantages over previous coupling circuits. By allowing the system to change the effective impedances during the transmit and the receive modes of operation, the specific impedance requirements for each of these modes can be achieved to ensure maximum effectiveness of the system. By implementing the invention coupling system, it is possible to have a PLDT system which employs multiple transceivers utilizing a number of different carrier frequencies without encountering the difficulties experienced in previous systems.

While the optimum impedance coupling system of the present invention has been described in connection with the preferred embodiment, it is not intended to limit the invention to the specific form set forth herein, but on the contrary, it is intended to cover such alternatives, modifications and equivalents as may be included within the scope and spirit of the invention as defined by the appended claims.

We claim:

1. An apparatus for coupling a transceiver to an AC power line, said transceiver comprising a transmitter portion for providing a first data signal to said AC power line and a receiver portion for receiving a second data signal from said AC power line, comprising:

a coupling circuit having first and second primary terminals and first and second secondary terminals, said primary terminals being electrically coupled to said power line, said secondary terminals being electrically coupled to said transceiver;

means for providing a first impedance between said first and second primary terminals and said first and second secondary terminals of said coupling circuit when said transceiver is transmitting said first data signal to said power line and means for providing a second impedance between said first and second primary terminals and said first and second secondary terminals of said coupling circuit when said transceiver is receiving said second data signal from said power line, said means for providing said first and second impedances each comprising at least one winding of a transformer electrically coupled to a means of switching, wherein said means for providing said first impedance, said means for providing said second impedance, at least one capacitor and one inductive element are arranged in a series connection between said first and second primary terminals of said coupling circuit; and said means for switching connecting said means for providing said first impedance and said means for providing said second impedance to said first and second secondary terminals, respectively, wherein said means for switching is operable to switch respectively between said first and second impedances when said transceiver is transmitting and when said transceiver is receiving, wherein the optimum combined impedance between said first and second primary terminals is between one and ten ohms when said transceiver is switched to operate in said transmit mode and between 350 and 400 ohms when said means for switching is set to operate in said receive mode.

2. An apparatus according to claim 1, further comprising high impedance isolation means electrically connected between said secondary terminals and said receiver portion of said transceiver.

3. An apparatus according to claim 2, further comprising tunable filter means electrically connected between said high impedance isolation means and said receiver portion of said transceiver.

4. An apparatus for coupling a transceiver to an AC power line, said transceiver comprising a transmitter portion for providing a first data signal to said AC power line and a receiver portion for receiving a second data signal from said AC power line, comprising:

a first transformer having a primary winding and a secondary winding, said primary winding defining first and second primary terminals, said first primary terminal being electrically connected to said power line, said secondary winding defining first and second secondary terminals, said first and second secondary terminals of said first transformer being electrically connected to said receiver portion of said transceiver;

a tuning capacitor connected between said first and second secondary terminals of said first transformer;

a second transformer having a primary winding and a secondary winding, said primary winding defining first and second primary terminals, said first primary terminal of said second transformer being electrically connected to said second primary terminal of said first transformer and said second primary terminal being electrically coupled to said power line, said secondary winding defining first and second secondary terminals, said first and second secondary terminals of said second transformer being electrically connected to the transmitter portion of said transceiver;

at least one inductor in series connection with at least one capacitor comprising the electrical connection between said first primary terminal of said first transformer and said power line; and switching means providing a switchable connection between said transmitter portion and said receiver portion and said secondary terminals of said first and second transformers, respectively, said switching means being disposed between said tuning capacitor and said second secondary terminal of said first transformer, said switching means operatively disconnecting said tuning capacitor and receiver portion from the first transformer during the time that said transmitter portion is connected to the second transformer, and said transceiver is transmitting said first data signal on said power line, said switching means operatively connecting said tuning capacitor and receiver portion to the first transformer while disconnecting the transmitter portion from the second transformer during the time that said receiver portion is receiving said second data signal from said AC power line.

5. An apparatus according to claim 4 further comprising high impedance isolation means as electrically connected between said secondary terminals of said first transformer and said receiver portion of said transceiver.

6. An apparatus according to claim 5, further comprising tunable filter means as electrically connected between said high impedance isolation means and said receiver portion of said transceiver.

7. An apparatus according to claim 6, the impedance between said first primary terminal of said first transformer and said second primary terminal of said second transformer being between one and ten ohms when said transceiver is switched to operate in said transmit mode and being between 350 and 400 ohms when switched to operate in said receive mode.

* * * * *